United States Patent Office 3,044,934
Patented July 17, 1962

---

3,044,934
PARENTERAL ADMINISTRATION OF METHANE-SULPHONATE OF POLYMYXIN A, B OR E
Samuel Wilkinson, London, England, assignor to Burroughs Wellcome & Co. (U.S.A.) Inc., Tuckahoe, N.Y., a corporation of New York
No Drawing. Filed May 24, 1960, Ser. No. 31,270
Claims priority, application Great Britain May 19, 1960
3 Claims. (Cl. 167—65)

This invention relates to polymyxin derivatives.

The polymyxins are a group of polypeptide antibiotics having activity against Gram-negative bacteria. Polymyxins A, B, and E are preferred.

For systemic treatment of bacterial infections, they need to be given by injection, and have the drawback of causing pain and undesirable local effects at the site of injection. It has now been found that N-methanesulphonate derivatives of polymyxins A, B and E have a greatly improved therapeutic index, give no trouble at the site of injection, and have an unaltered antibacterial spectrum. For example, the sodium N-methanesulphonate derivative of polymyxin B has 25% of the antibacterial activity of polymyxin B, but only 2% of the intravenous toxicity.

The N-methanesulphonate derivatives are made by converting amino groups NH in the polymyxin molecule into groups of the formula $N.CH_2.SO_3^-$. The cation associated with the derivative grouping is conveniently sodium, but may be any therapeutically acceptable inorganic or organic cation. Polymyxin A, B or E is treated successively with formaldehyde and with a sulphite salt, conveniently sodium metabisulphite.

The invention in one aspect therefore comprises the N-methanesulphonate derivatives of polymyxins A, B and E, in a second aspect comprises the above-described method for making the derivatives, and in a third aspect comprises a method for the treatment of bacterial infections by the administration of an N-methanesulphonate derivative of polymyxin A, B or E.

The following examples illustrate the invention.

Sodium Polymyxin Methanesulphonate

Polymyxin B sulphate (50 g., 8076μ/mg.) is dissolved in water (500 ml.). Formaldehyde solution (50 ml. 30% aqueous formaldehyde brought to pH 7.2 with N-NaHCO₃) is added with stirring. Sodium bicarbonate (250 ml., N-solution) is added, stirring and controlling the frothing with acetone. The precipitated polymyxin B formaldehyde derivative is filtered, washed with water (1.5 l.) and whilst still moist is stirred into 500 ml. water. A solution of sodium metabisulphite, $Na_2S_2O_5$ (15.2 g. in 50 ml. water) is added. On stirring vigorously and gently warming to 40–50° C. a clear solution is obtained after about 10 minutes.

The solution of sodium polymyxin B methanesulphonate has a pH of 8.93 and this is adjusted to pH 7.1 by cautious addition of N-HCl. The solution is filtered and freeze-dried. (Yield 55 g.)

Other salts were conveniently made from the above-described sodium salt by treatment with the chloride of the desired cation in aqueous or alcoholic solution. The insoluble silver salt was made from silver sulphate. If the desired polymyxin B methanesulphonate salt was insoluble in water, it could be collected by filtration. If the desired salt was water-soluble, it could be made from an alcoholic suspension of the silver salt, or an alcoholic solution of the sodium salt, and an alcoholic solution of the chloride of the desired cation. The unwanted silver chloride or sodium chloride was removed by centrifugation or filtration, and the desired salt subsequently precipitated by treatment with ether.

The following polymyxin B methanesulphonate salts were made by this procedure. All were solids of indeterminate melting point.

Soluble in water:
　Procaine salt
　Ephedrine salt
　Benzylamine salt
Insoluble in water:
　Barium salt
　Auramine salt
　1,2,3,4-tetrahydroisoquinoline salt
　3-β-naphthoxypropylamine salt

Sodium Polymyxin E Methanesulphonate

Polymyxin E sulphate (1 g.) is dissolved in water (20 ml.) and neutral formaldehyde solution (as described above) (4 ml.) is added. Sodium bicarbonate solution (20 ml. N-solution) is added and the precipitated polymyxin E formaldehyde derivative is filtered and washed with water. The moist solid is suspended in water (50 ml.) and sodium metabisulphite (1 g.) added. A clear solution is obtained after a few minutes and is freeze-dried. The flocculent white solid is extracted with warm methanol (75 ml.) and filtered. The clear filtrate is poured into dry acetone (400 ml.) and the white flocculent precipitate filtered, washed with acetone and dry ether and dried in vacuo. (Yield 1.2 g.)

Sodium Polymyxin A Methanesulphonate

This is prepared in precisely the same manner as the sodium polymyxin E methanesulphonate.

Polymyxin B Methanesulphonates

Alternatively the solution of the sodium polymyxin B methanesulphonate can be brought to pH 2 by addition of acid when polymyxin B methanesulphonic acid is precipitated, centrifuged and washed with water. On shaking a suspension of the methanesulphonic acid in water with the appropriate base a solution of the salt is obtained which is isolated by freeze-drying the solution.

What I claim is:

1. A method for the treatment of bacterial infections which comprises the parenteral administration of an N-methanesulphonate derivative of a polymyxin selected from the class consisting of polymyxins A, B and E containing a therapeutically acceptable cation.

2. A method for the treatment of bacterial infections which comprises the parenteral administration of an N-methanesulphonate derivative of polymyxin B.

3. A method for the treatment of bacterial infections which comprises the parenteral administration of an N-methanesulphonate derivative of polymyxin E.

References Cited in the file of this patent

Lagemann et al.: Arzneimittel Forsch., vol. 5, pp. 213–21, abstracted in C.A., vol. 49 (1955), #11244E.

Higuchi et al.: "Reactivity of Bisulfite with a Number of Pharmaceuticals," in J.A.Ph.A. (Sci. Ed.) vol. XLVIII, No. 9, September 1959, pp. 535–540.